United States Patent
Bass, Sr. et al.

(10) Patent No.: US 7,487,227 B2
(45) Date of Patent: Feb. 3, 2009

(54) SCRIPTING ENGINE HAVING A SEQUENCER TABLE AND A PLURALITY OF SECONDARY TABLES FOR NETWORK COMMUNICATION SOFTWARE

(75) Inventors: Elijah W. Bass, Sr., Mount Laurel, NJ (US); Bilgehan Erman, Marlboro, NJ (US); David P. Mongeau, Columbus, OH (US); Mengqi Wu, Columbus, OH (US); Chen Xie, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1001 days.

(21) Appl. No.: 10/860,235

(22) Filed: Jun. 3, 2004

(65) Prior Publication Data

US 2005/0273755 A1 Dec. 8, 2005

(51) Int. Cl.
*G06F 15/16* (2006.01)

(52) U.S. Cl. .................. 709/219; 709/217; 709/223; 709/224

(58) Field of Classification Search ......... 709/217–220, 709/223–224
See application file for complete search history.

(56) References Cited

U.S. PATENT DOCUMENTS

| | | | |
|---|---|---|---|
| 6,078,951 A * | 6/2000 | Pashupathy et al. ......... | 709/217 |
| 6,175,864 B1 * | 1/2001 | Addison et al. ............. | 709/219 |
| 6,944,660 B2 * | 9/2005 | Eshghi et al. ............... | 709/224 |
| 7,047,423 B1 * | 5/2006 | Maloney et al. ............. | 709/224 |
| 7,321,929 B2 * | 1/2008 | Rolfe ......................... | 709/223 |
| 7,356,816 B2 * | 4/2008 | Goodman et al. ........... | 709/220 |
| 7,424,384 B2 * | 9/2008 | Wheeler et al. ............. | 709/224 |
| 2003/0005110 A1 * | 1/2003 | Corbin et al. ............... | 709/224 |

* cited by examiner

*Primary Examiner*—Bharat N Barot (57) ABSTRACT

A scripting engine for network communication software is described. The scripting engine includes a sequencer table and plurality of secondary tables. The sequencer table and plurality of secondary tables provide a table-based command-processing engine to control the functionality of the network communication software. The sequencer table includes commands that are read in a sequential order. The commands are grouped into command types that each defines a specific set of related functionality. Each of the plurality of secondary tables is mapped to a particular one of the command types. Each of the secondary tables includes one or more records containing one or more specific instructions to enable the network communication software application to perform a particular operation indicated by the command, when the network communication software application instructs the scripting engine to process the sequencer table.

31 Claims, 4 Drawing Sheets

SCRIPTING ENGINE HAVING A SEQUENCER TABLE AND A PLURALITY OF SECONDARY TABLES FOR NETWORK COMMUNICATION SOFTWARE

TECHNICAL FIELD

The present invention relates to network communication software, such as network data extraction and communication software, and to development and modification of such network communication software.

BACKGROUND

As used herein, a network communication application is software that is used to communicate (via one or more computers) with network equipment in communication networks and extract data from the network equipment for purposes of managing the communication networks. Communication networks may consist of hundreds of different types of network equipment and include different types of networks, such as Internet Protocol (IP) networks, asynchronous transfer networks, optical networks, wireless networks, a combination of any such networks, and the like. Enabling a network communication application (via one or more computers) to communicate with the various different types of networks and network equipment is daunting given the many incompatibilities and differences associated with languages and protocols used by such networks and equipment.

Complicating matters further is the challenge associated with dealing with changes made to the many different types of network equipment residing in the different network environments. To account for these ever-constant changes, it is often necessary to change, update, patch or otherwise modify software code associated with the network communication application in order for the network communication application to communicate with newly added or updated network equipment.

Modifying a network communication application to account for changes made to network equipment in communication networks is not a trivial matter for a software developer. Typically a network communication application is a very sophisticated program containing millions of lines of code. Besides the volume of software code, the software developer has to account for the many dependencies hidden in the software code, which may be affected by modifying the code. A dependency is a logical constraint between two or more portions of code or two or more portions of operations performed by the code. For example, where the order of a first operation in a sequential program produces a result that is an operand of a second operand, a dependency is formed such that the second operand cannot be performed until the first operation has been completed, since the first operand value would not otherwise be available.

Accounting for dependencies when modifying an application often can take more time than it may have taken to create and develop the software application in the first place. These costly implementation delays increase the expense associated with modifying and updating network communication applications, and such delays further inconvenience customers that depend on the applications.

SUMMARY

The problems described above, such as accounting for dependencies when modifying software code, are overcome in accordance with principles of the invention, by using a scripting engine that uses tables instead of sequential code, as in the prior art, to control the operation of a network communication software application.

In one implementation, the scripting engine is a module that resides within the network communication software application and allows the network communication software application to communicate with and extract data from network equipment without relying on compiled code. The scripting engine includes a sequencer table and a plurality of secondary tables. The sequencer table includes commands that are read in a sequential order. The commands are grouped into command types that each defines a specific set of related functionality. Each of the plurality of secondary tables is mapped to a particular one of the command types. Each of the secondary tables includes one or more records containing one or more specific instructions to enable the network communication software application to perform a particular operation indicated by the command, when the network communication software application reads the command from the sequencer table.

Accordingly, by enabling the software developer to populate a primary table (also referred to as a sequencer table) with sequential commands, and to populate secondary tables with coded instructions mapped to the sequential commands, it is possible to eliminate the need for the software developer to manually compile software code. It is also possible to eliminate dependencies associated with compiling such code. When updates are made to the network communication application, only one or more records in the tables need to be modified and there is no need to rewrite and recompile code, since the code itself is contained in tables rather than in a compiled format. In other words, the scripting engine provides a mechanism for users of the network communication software application to configure and reconfigure how the communication software application functions without having to design, compile and recompile code.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Exemplary Network Environment

Figure 1:
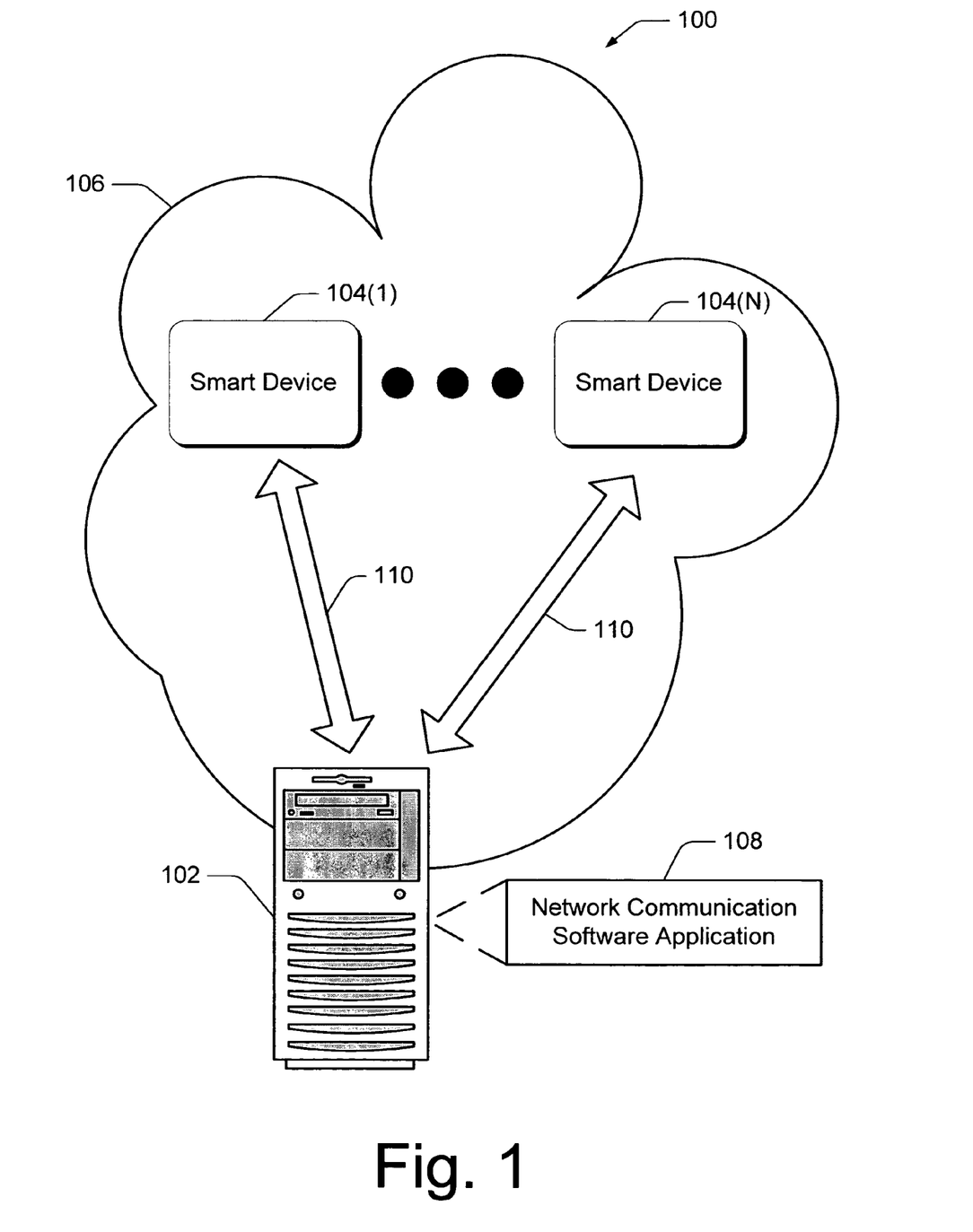
FIG. 1 illustrates a network environment in which a computer is able to access other smart devices for purposes of administering and managing a network.

FIG. 1 illustrates a network environment 100 in which a computer 102 is able to access other smart devices 104(1), . . . , 104(N) for purposes of administering and managing a network 106. Computer 102 and smart devices 104, can be implemented in many different formats, including, without limitation, personal computers, server computers, portable computers, personal digital assistants, routers, switches, wireless devices, telecommunication devices, optical devices, and other smart device/computer configurations.

Computer 102 uses network communication software application 108 to interact programmatically over network 106 with smart devices, referred to generally as reference number 104. Network communication software application 108 enables computer 102 to communicate with smart devices 104 in any number of industry communication protocols, such as Simple Network Management Protocol (SNMP), Transaction Language 1 (TL1), Telnet, File Transfer Protocol (FTP), although other means for communicating with smart devices 104 over network 106 may be used. Communication links 110 between computer 102 and smart devices 104 represent any number various communication mediums, including but not limited to, wired, wireless, and/or optical communication links.

Network communication software application 108 is configured to execute on most computer devices such as computer 102. Additionally, portions of network communication software application 108 may reside on several devices, such as in a distributed environment. Furthermore, network communication software application 108 may be combined with or reside within other software systems, such as an operating system. Accordingly, network communication software application 108 is intended to represent a wide variety of network management software applications that incorporate features described herein and as pointed out in the appending claims.

Scripting Engine

Figure 2:
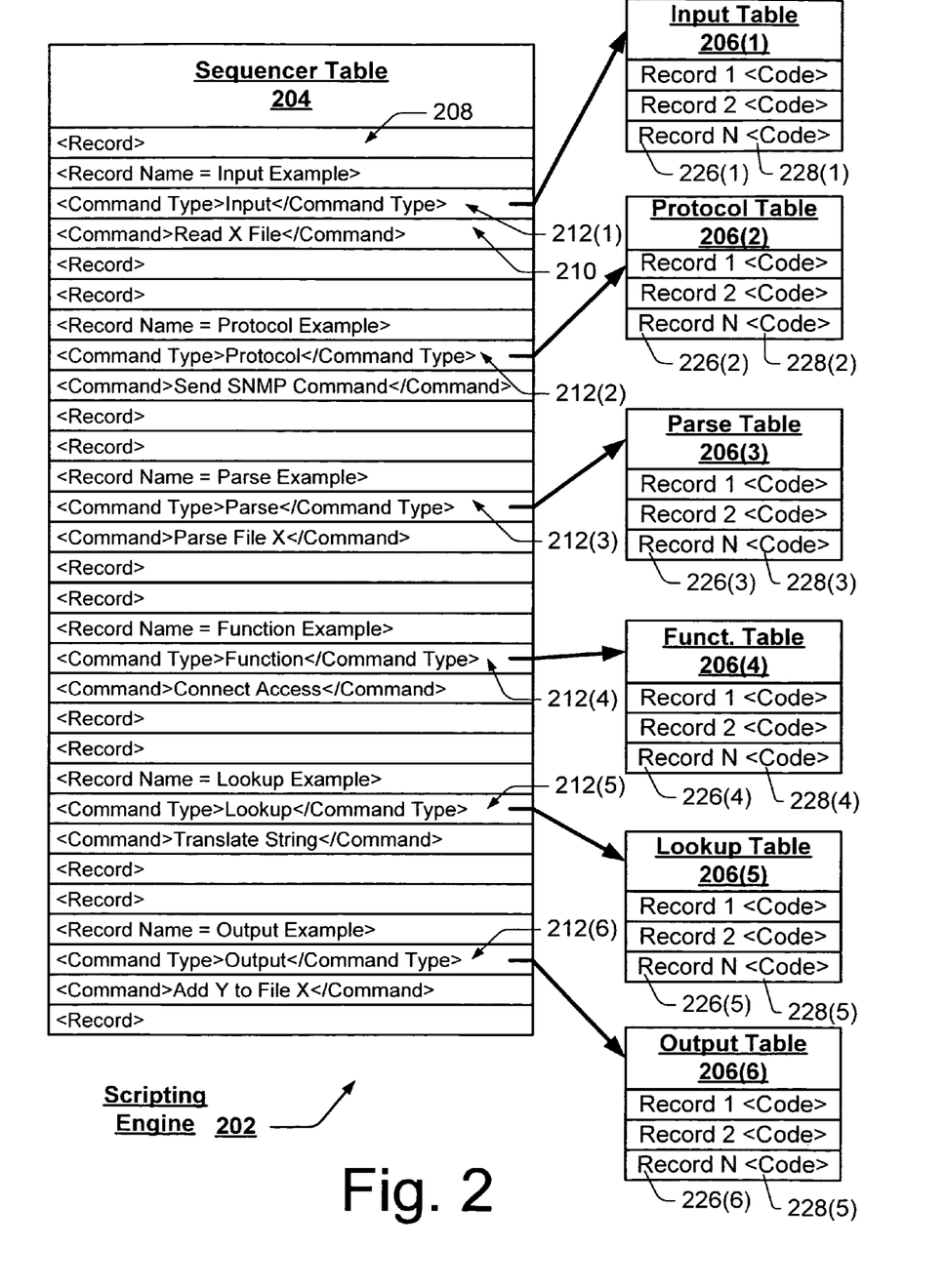
FIG. 2 shows a block diagram of a scripting engine that may be used in conjunction with a network communication software application.

FIG. 2 shows a block diagram of an exemplary scripting engine 202 that may be used in conjunction with network communication software application 108. Scripting engine 202 is a module that resides within network communication software application 108. Alternatively, scripting engine 202 may be implemented as an independent component, functioning as a network protocol adaptor, providing an application programming interface (API) to network communication software application 108. As used herein, an "adapter" generally means software that allows heterogeneous components in the form of software and/or data sources to interoperate and share data with each other. An "API" generally means a module that includes a series of functions that other programs may rely on to interface and communicate with other components such as an operating system, a file, etc.

Scripting engine 202 provides a mechanism for users of network communication software application 108 (or of scripting engine 202) to configure and reconfigure how communication software application 108 functions without having to design, compile and recompile code. Scripting engine 202 enables users to formulate functionality for network communication software application 108 using high level languages, such as XML (extensible markup language), which uses declarative tags to define what elements or data are contained within the declarative tags. XML allows the user to define tag elements and store the results in tables or database records, sometimes referred to as XML files. Although the embodiments described herein with respect to scripting engine 202 are described in conjunction with XML, such is not required for the operation of the claimed invention. Other viable technologies will suffice to implement the inventions described herein. For instance, database records that use other standards could be used to implement scripting engine 202.

In one implementation, scripting engine 202 includes at least one sequencer table 204 and a plurality of secondary tables 206(1), 206(2), 206(3), 206(4), 206(5), 206(6).

Sequencer table 204 is an XML file that includes a list of records 208 each containing a command 210, read by scripting engine 202 to perform operations in a sequential order. Each command is logically related to a command type 212 that defines a specific set of related functionality. In other words, each command 210 is grouped into (i.e., correlates to) one of a plurality of command types 212(1), 212(2), 212(3), 212(4), 212(5), 212(6). Each command type defines a specific set of related functionality. By grouping commands 210 into specific command types, referred to generally as reference number 212, it is possible to map command types 212 from sequencer table 204 to a particular one of the plurality of secondary tables 206(1), 206(2), 206(3), 206(4), 206(5), 206(6). In other words a command type serves as a link to call one of the plurality of secondary tables mapped to the particular command type.

For instance, in one implementation, scripting engine 202 has six different command types including: an input command type 212(1), a protocol command type 212(2), a parse command type 212(3), a function command type 212(4), a lookup command type 212(5), and an output command type 212(6). Each one of these command types links (i.e., maps) commands 210 listed in sequencer table 204 to a particular one of the plurality of secondary tables 206(1), 206(2), 206(3), 206(4), 206(5), and 206(6), respectively. Commands 210 instruct execution of generic code that may be written in lower level functional languages, such as Java or C++. It is noted that scripting engine 202 may use different command type designations than the exemplary illustration, as well as a greater or smaller quantity of command types than the six illustrated above. Additionally, the order of commands and frequency of their use may vary. The schema shown in any of the tables depicted in FIG. 2 are purely for illustrative purposes, as those skilled in the art would readily appreciate.

Each of the secondary tables 206 includes one or more records. Each of the records contain specific instructions that enable the scripting engine 202 to perform a particular functionality indicated by the command 210. Like the sequencer table 204, secondary tables 206 are XML files that include records that include specific coded instructions that perform functionality associated with a command type 212.

For instance, input command type 212(1) identifies commands 210 that pertain to populating literal values and extracting data from files. Accordingly, an input command type 212(1) when read by scripting engine 202 calls at least one input table 206(1) including one or more records 226(1) containing one or more instructions 228(1) associated with populating values, populating vectors, and/or extracting content. Each one of these specific instruction(s) 228(1) is encapsulated in XML, and instruction(s) 228(1) point to generic, pre-coded, lower level software code that may be implemented in some form of a programming language (such as Java code). Scripting engine 202 uses a uniform (e.g., uniform/well defined) interface to interact with lower level code, which may include vector, data, register value, and so forth.

Protocol command type 212(2) identifies commands 210 that pertain to communicating in various network protocol languages. Accordingly, a protocol command type 212(2) when read by scripting engine 202 calls at least one protocol table 206(2) including one or more records 226(2) containing one or more instructions 228(2) associated with communicating in a protocol language, such as SNMP, TL1, Telnet, FTP. A user can populate the actual table(s) 206(2) with particular protocol instructions encapsulated in XML or alternative formats.

Parse command type 212(3) identifies commands that pertain to parsing instructions and data. Accordingly, a parse command type 212(3) when read by network communication software application 108 calls at least one parse table 206(3) including one or more records 226(3) containing one or more instructions 228(3) associated with parsing data content. For instance, a user can populate parse table 206(3) with industry standard patterns (such as Regular Expression) indicating how to parse data content.

Function command type 212(4) identifies commands that pertain to performing customized processing associated with special operations not found in the generic, pre-coded set of low level code. Accordingly, a function command type 212(4) when read by network communication software application 108 calls at least one function table 206(4) including one or more records 226(4) containing one or more instructions 228(4) associated with customized processing. For instance, a user can populate function table 206(4) with instructions that do not neatly fall within other categories of grouping, i.e., a default table for miscellaneous instructions associated with the scripting engine 202. Thus, function command type 212 (4), via commands 210, may also enable execution of specific code that may be written in lower level functional languages. This provides extension capability to implement additional functional needs.

Lookup command type 212(5) identifies commands that pertain to mapping symbols and translating string identifiers to string descriptions. Accordingly, a lookup command type 212(5) when read by scripting engine 202 calls at least one lookup command table 206(5) including one or more records associated with mapping symbols, and/or translating string identifiers to string descriptions.

Output command type 212(6) identifies commands that pertain to how to format and where to deposit data. Accordingly, an output command type 212(6) when read by scripting engine 202 calls at least one output table 206(6) that includes one or more records associated with instructing scripting engine 202 how to format and where to deposit data. For instance, output table 206(6) may be populated with industry standard Xpath patterns that instruct scripting engine 202 how to generate XML data content.

It is noted that sequencer table 204 and secondary tables 206 are pre-loaded with commands and code associated with such commands, respectively, generally before network communication software application 108 and scripting engine 202 can run. Once the tables are populated, network communication software application 108 communicates with scripting engine 202 which in turn processes sequencer table 204 and calls the appropriate secondary tables 206 indicated by sequencer table 204. Now, by simply modifying sequencer table 204 and/or any of the secondary tables 206, it is possible to update (i.e., modify, patch, or change) the functionality of the network communication software application 108. This is all accomplished without having to rewrite or recompile java code (or other code).

Thus, scripting engine 202 uses a sequencer table 204 with pre-populated commands in conjunction with and a plurality of secondary tables 206 with pre-populated instructions to execute lower level, generic code (such as Java code) associated with the command type read from the sequencer table 204. This enables network communication software application 108 to carry out operations such as issuing messages to network equipment without having to compile and re-build code. In other words, scripting engine 202 through the use of pre-populated tables performs back-end processing for network communication software application 108.

Methods for Scripting Engine

Methods for a scripting engine may be described in the general context of computer-executable instructions. For example, network communication software application 108 (FIG. 1) obtains its functionality through a scripting engine 202 (FIG. 2) in the form of computer-executable instructions. Generally, computer-executable instructions include routines, program modules, programs, objects, components, data structures, and the like that perform particular functions or implement particular abstract data types. The described methods may also be practiced in distributed computing environments where functions are performed by remote processing devices that are linked through a communications network. In a distributed computing environment, computer-executable instructions may be located in both local and remote computer storage media, including memory storage devices.

Figure 3:
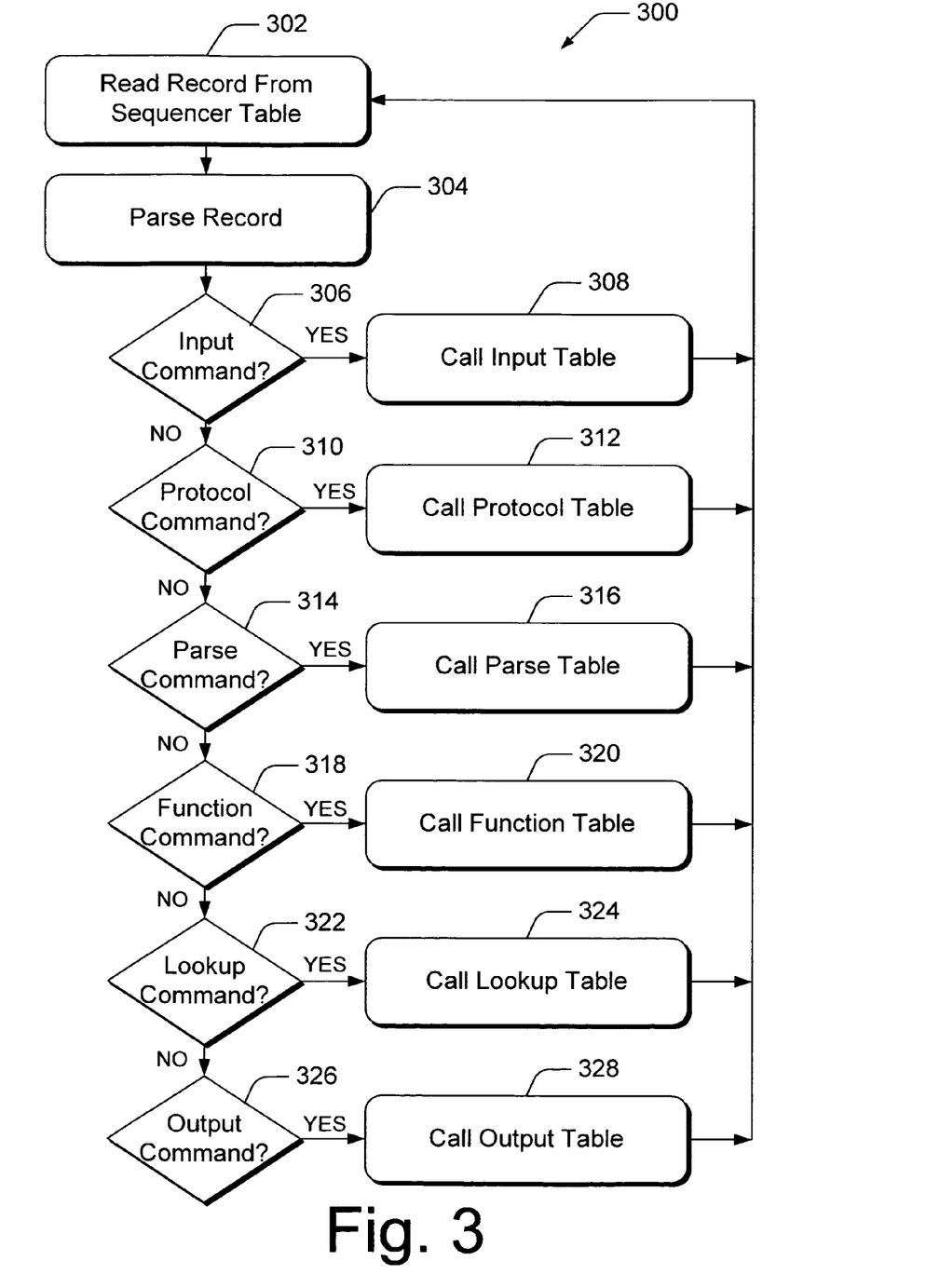
FIG. 3 illustrates a method used to implement a scripting engine for a network communication software application.

FIG. 3 illustrates a method 300 used to implement a scripting engine for a network communication software application. Method 300 includes blocks 302-328. The order in which the method is described is not intended to be construed as a limitation, and any number of the described method blocks can be combined in any order to implement the method. Furthermore, the method can be implemented in any suitable hardware, software, firmware, or combination thereof.

In block 302, a record is read from a sequencer table. For example, network communication software application 108 reads a record from sequencer table 202.

In block 304, the record is parsed. For example, network communication software application 108 parses the record to determine what command(s) and command type(s) are contained in the record.

In a decisional block 306, a determination is made whether the record contains command(s) associated with (i.e., logically related to) an input command type. If according to the YES branch of decisional block 306, the command(s) is an input command type, then according to block 308, a network communication software application selects at least one secondary table associated with performing functionality pertaining to the input command type. For example, an input command type 212(1) (FIG. 2) when read by scripting engine 202 (FIG. 2) calls an input table 206(1) (FIG. 2) including one or more records 226(1) containing one or more instructions 228(1) (FIG. 2) associated with populating values, populating vectors, and/or extracting content.

If according to the NO branch of decisional block 306 the command(s) is not an input command type, then according to a decisional block 310 a determination is made whether the record contains command(s) associated with a protocol command type.

If according the YES branch of decisional block 310 the command(s) is an protocol command type, then according to block 312, a network communication software application selects at least one secondary table associated with (i.e., logically related to) performing functionality pertaining to the protocol command type. For example, a protocol command type 212(2) (FIG. 2) when read by scripting engine 202 (FIG. 2) calls a protocol table 206(2) (FIG. 2) including one or more records 226(2) containing one or more instructions 228(2) (FIG. 2) associated with communicating in a protocol language, such as SNMP, TL1, Telnet, FTP.

If according to the NO branch of decisional block 310, the command(s) is not a protocol command type, then according to a decisional block 314 a determination is made whether the record contains command(s) associated with a parse command type.

If according to the YES branch of decisional block 314 the command is a parse command type, then according to block 316, the scripting engine 202 selects at least one secondary table associated with (i.e., logically related to) performing functionality pertaining to the parse command type. For example, a parse command type 212(3) (FIG. 2) when read by scripting engine 202 (FIG. 2) calls a parse table 206(3) including one or more records 226(3) containing one or more instructions 228(3) associated with parsing data content.

If according to the NO branch of decisional block 314, the command(s) is not a parse command type, then according to a decisional block 318 a determination is made whether the record contains command(s) associated with a function command type.

If according to the YES branch of decisional block 318 the command is a function command type, then according to block 320, the scripting engine 202 selects at least one secondary table associated with performing functionality pertaining to the function command type. For example, when a function command type is read by scripting engine 202 (FIG. 2), it calls a function table 206(4) (FIG. 2) including one or more records 226(4) (FIG. 2) containing one or more instructions 228(4) associated with customized processing.

If according to the NO branch of decisional block 318, the command(s) is not a function command type, then according to a decisional block 322 a determination is made whether the record contains command(s) associated with a lookup command type.

If according to the YES branch of decisional block 322 the command is a lookup command type, then according to block 324, the scripting engine 202 selects at least one secondary table associated with performing functionality pertaining to the lookup command type. For example, when a lookup command type is read by scripting engine 202 (FIG. 2), it calls a lookup table 206(5) (FIG. 2) including one or more records 226(5) (FIG. 2) containing one or more instructions 228(5) associated with associated with mapping symbols, and/or translating string identifiers to string descriptions.

If according to the NO branch of decisional block 322, the command(s) is not a lookup command type, then according to a decisional block 326 a determination is made whether the record contains command(s) associated with an output command type.

If according to the YES branch of decisional block 326 the command is an output command type, then according to block 328, the scripting engine 202 selects at least one secondary table associated with performing functionality pertaining to the lookup command type. For example, when a lookup command type is read by scripting engine 202 (FIG. 2), it calls an output table 206(6) (FIG. 2) including one or more records 226(6) (FIG. 2) containing one or more instructions 228(6) associated with associated with instructing scripting engine 202 how to format and where to deposit data, e.g., in a file in XML or any other format or in a database table, etc.

After completion of operations performed in any one of the blocks illustrated in method 300, method 300 continues as outlined above. It is noted that operations performed in decisional blocks 306, 310, 314, 318, 322, and 326, could be performed simultaneously even though they are depicted as being performed in a sequential order.

Exemplary Computing Environment

Figure 4:
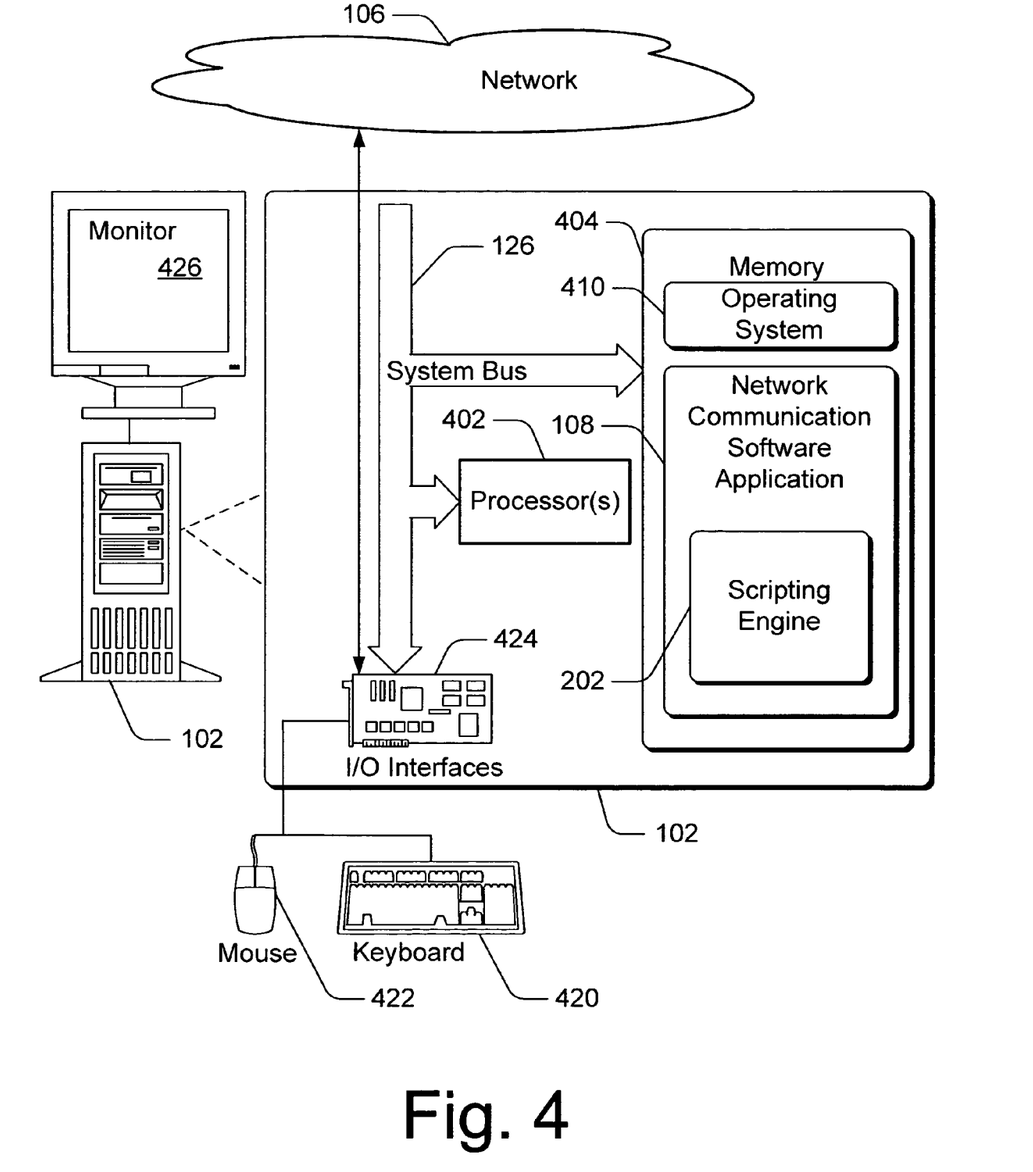
FIG. 4 illustrates an exemplary computer in which a network communication software application and scripting engine may operate.

FIG. 4 illustrates an exemplary computer 102 in which network communication software application 108 and scripting engine 202 may operate. Computer 102 includes one or more processor(s) 402 that execute various instructions to control the operation of computer 102 and to communicate with other electronic and computing devices. Processor(s) 402 may represent microprocessors, proprietary processors, state-machines, programmable logic devices, and other processing engines.

Computer 102 may include memory 404 in a variety of computer readable media. Such media can be any available media that is accessible by computer 102 and includes both non-volatile (not shown) and volatile media (not shown), in the form of removable and non-removable media. For example, non-volatile media may include read only memory (ROM) and volatile media may include computer readable media in the form of random access memory (RAM). ROM typically contains basic routines used to provide basic functionality to elements in computer 102, such as the transfer of information between elements in computer 102. RAM typically contains data and/or program modules that are immediately accessible to and/or presently operated on by processor(s) 402, which may include one or more portions of cache. Memory 404 can also include other removable/non-removable, computer storage media, such as but not limited to, a hard disk drive non-volatile magnetic media, other magnetic storage devices such as a magnetic disk drive, magnetic cassettes, a "floppy disk," optical disks such as a CD-ROM, DVD-ROM, or other optical media. It is to be appreciated that other types of memory may be accessible by a computer 102 such as, flash memory cards, electrically erasable programmable read-only memory (EEPROM), and so forth.

Although shown herein as a single discrete block within computer 102, portions of memory 404 may reside locally within computer 102 and/or reside remotely from computer 102, but be accessible to computer 102 via some type of input/output device, such as by a SCSI interface (not shown).

Any number of program modules can be stored in memory 404, including by way of example, one or more operating systems 410, network communication software application 108, and scripting engine 202. For purposes of illustration, the one or more operating systems 410 network communication software application 108, and scripting engine 202 are illustrated herein as discrete blocks, although it is recognized that such programs and components may reside at various times in different storage components of computer 102, and are executed by processor(s) 402.

A user can enter commands and information into computer 102 via input devices such as a keyboard 420 and a pointing device 422 (e.g., a "mouse"). Other input devices (not shown specifically) may include a microphone, a joystick and/or the like. These and other input devices are connected to the computer 102 via input/output interfaces 424, such as a parallel port, a universal serial bus (USB), or may be connected remotely through a network or a wireless communication link. A monitor 426 or other type of display device can also be connected to computer 102 to provide graphical information to a user.

It is to be appreciated that additional components can be included in computer 102. For example, additional processors or storage devices, additional I/O interfaces, and so forth may be included in computer 102. It is also recognized that there are a variety of system busses, point-to-point connections, and various other connection configurations that may be used to connect the various components within computer 102 and for purposes of this discussion any of these variety of configurations may be included.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A scripting engine for a network communication software application, the scripting engine comprising computer executable instructions embodied on one or more computer-readable storage media, the scripting engine comprising:
   a sequencer table comprising commands read by the network communication software application to perform operations in a sequential order, wherein each command correlates to a command type that defines a specific set of related functionality; and
   a plurality of secondary tables each mapped to a particular one of the command types and each comprising one or more records containing one or more specific instructions to enable the scripting engine and the network communication software application to perform a particular operation indicated by the command.

2. The scripting engine as recited in claim 1, wherein a command type includes one of the following command types: an input command type, a protocol command type, a parse command type, a function command type, a lookup command type, and an output command type.

3. The scripting engine as recited in claim 1, wherein the sequencer table is an XML file.

4. The scripting engine as recited in claim 1, wherein the plurality of secondary tables are XML files.

5. The scripting engine as recited in claim 1, wherein one of the plurality of secondary tables includes an input table comprising a record containing an instruction associated with populating values, populating vectors, and/or extracting content.

6. The scripting engine as recited in claim 1, wherein one of the plurality of secondary tables includes a protocol table comprising a record containing an instruction associated with communicating in a protocol language.

7. The scripting engine as recited in claim 1, wherein one of the plurality of secondary tables includes a parse table comprising a record containing an instruction associated with parsing data content.

8. The scripting engine as recited in claim 1, wherein one of the plurality of secondary tables includes a function table comprising a record containing an instruction associated with performing customized processing associated with network communication functionality.

9. The scripting engine as recited in claim 1, wherein one of the plurality of secondary tables comprises a lookup table comprising a record containing an instruction associated with mapping symbols, and/or translating string identifiers to string descriptions.

10. The scripting engine as recited in claim 1, wherein one of the plurality of secondary tables includes a lookup table comprising a record containing an instruction associated with mapping symbols, and/or translating string identifiers to string descriptions.

11. The scripting engine as recited in claim 1, wherein one of the plurality of secondary tables includes an output table comprising a record containing an instruction associated with instructing the scripting engine how to format and where to deposit data.

12. The scripting engine as recited in claim 1, wherein a command type serves as a link to call one of the plurality of secondary tables mapped to the particular command type.

13. A network communication software application comprising the scripting engine as recited in claim 1.

14. A network communication software application comprising computer executable instructions embodied on one or more computer readable storage media, comprising:
   a scripting engine comprising a sequencer table; and
   a plurality of secondary tables;
   wherein the sequencer table comprises commands in a sequential order, the commands are grouped into command types that each defines a specific set of related functionality,
   wherein each of the plurality of secondary tables is mapped to a particular one of the command types, and each of the secondary table includes one or more records containing one or more specific instructions to enable the scripting engine and the network communication software application to perform a particular operation indicated by the command when the scripting engine reads the command from the sequencer table.

15. The scripting engine as recited in claim 14, wherein a command type includes one of the following command types: an input command type, a protocol command type, a parse command type, a function command type, a lookup command type, and an output command type.

16. The scripting engine as recited in claim 14, wherein the sequencer table is an XML file.

17. The scripting engine as recited in claim 14, wherein the plurality of secondary tables are XML files.

18. The scripting engine as recited in claim 14, wherein one of the plurality of secondary tables includes an input table comprising a record containing an instruction associated with populating values, populating vectors, and/or extracting content.

19. The scripting engine as recited in claim 14, wherein one of the plurality of secondary tables includes a protocol table comprising a record containing an instruction associated with communicating in a protocol language.

20. The scripting engine as recited in claim 14, wherein one of the plurality of secondary tables includes a parse table comprising a record containing an instruction associated with parsing data content.

21. The scripting engine as recited in claim 14, wherein one of the plurality of secondary tables includes a function table comprising a record containing an instruction associated with performing customized processing associated with any network communication functionality.

22. The scripting engine as recited in claim 14, wherein one of the plurality of secondary tables includes a lookup table comprising a record containing an instruction associated with mapping symbols, and/or translating string identifiers to string descriptions.

23. The scripting engine as recited in claim 14, wherein one of the plurality of secondary tables includes an output table comprising a record containing an instruction associated with instructing the scripting engine how to format and where to deposit data.

24. The scripting engine as recited in claim 14, wherein a command type serves as a link to call one of the plurality of secondary tables mapped to the particular command type.

25. A computer implemented method, comprising:
   creating a sequencer table comprising commands to be read by a scripting engine to perform operations in a sequential order, wherein each command is logically related to a command type that defines a specific set of related functionality; and
   creating a plurality of secondary tables each mapped to a particular one of the command types and each comprising one or more records containing one or more specific instructions to enable the scripting engine to perform a particular operation indicated by the command.

26. The method as recited in claim 25, wherein creating the sequencer table includes populating a file with command types that includes at least one of an input command type, a protocol command type, a parse command type, a function command type, a lookup command type, and an output command type.

27. The method as recited in claim 25, wherein creating the sequencer table includes grouping commands with a command type.

28. The method as recited in claim 25, wherein the sequencer table is an XML file.

29. The method as recited in claim 25, wherein the plurality of secondary tables are XML files.

30. The method as recited in claim 25, wherein creating a plurality of secondary tables includes populating the tables with records containing instruction code associated with the command type mapped to the secondary table.

31. The method as recited in claim 25, wherein the command type includes an XML declarative command.

* * * * *